US012418113B2

(12) United States Patent
Hsiao et al.

(10) Patent No.: US 12,418,113 B2
(45) Date of Patent: Sep. 16, 2025

(54) MULTIBAND PRINTED ANTENNA

(71) Applicant: Cheng Uei Precision Industry Co., LTD., New Taipei (TW)

(72) Inventors: Lan-Yung Hsiao, New Taipei (TW); Ping-Chun Lu, New Taipei (TW); Shao-Kai Sun, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 104 days.

(21) Appl. No.: 18/404,879

(22) Filed: Jan. 4, 2024

(65) Prior Publication Data

US 2024/0332801 A1 Oct. 3, 2024

(30) Foreign Application Priority Data

Mar. 28, 2023 (CN) ......................... 202320631225.1

(51) Int. Cl.
*H01Q 9/04* (2006.01)
*H01Q 1/24* (2006.01)
*H01Q 1/48* (2006.01)

(52) U.S. Cl.
CPC ........... *H01Q 9/0414* (2013.01); *H01Q 1/243* (2013.01); *H01Q 1/48* (2013.01)

(58) Field of Classification Search
CPC ......... H01Q 9/0414; H01Q 1/243; H01Q 1/48
See application file for complete search history.

(56) References Cited

U.S. PATENT DOCUMENTS

2011/0279341 A1* 11/2011 Chang .................... H01Q 5/392
343/822

* cited by examiner

*Primary Examiner* — Graham P Smith
(74) *Attorney, Agent, or Firm* — Cheng-Ju Chiang

(57) ABSTRACT

A multiband printed antenna includes a radiation unit and a grounding unit. The radiation unit is arranged at a right of a circuit board. The radiation unit includes a first radiation part, and a second radiation part which is extended upward and then is bent rightward from a left of a top edge of the first radiation part. The grounding unit is arranged at a left of the circuit board. The grounding unit is separated from the radiation unit. The grounding unit includes a first extension, a second extension straightly extended leftward from a top of a first left edge of the first extension, a grounding part straightly extended leftward from a bottom of the first left edge of the first extension, and a third extension straightly extended leftward from a middle of the first left edge of the first extension.

9 Claims, 6 Drawing Sheets

| Frequency(GHz) | Efficiency(%) |
|---|---|
| 2.4 | 83.65 |
| 2.45 | 84.3 |
| 2.5 | 70.08 |
| 4.9 | 63.46 |
| 5 | 68.9 |
| 5.15 | 60.15 |
| 5.55 | 83.33 |
| 5.85 | 64.41 |
| 6 | 60.92 |

(Data Table)

FIG. 6

MULTIBAND PRINTED ANTENNA

CROSS-REFERENCE TO RELATED APPLICATIONS

The present application is based on, and claims priority from, China Patent Application No. 202320631225.1, filed Mar. 28, 2023, the disclosure of which is hereby incorporated by reference herein in its entirety.

PRIOR ART

With the rapid development of wireless communication industries, a Wi-Fi 6E (Extended) technology is gradually popularized, the Wi-Fi 6E technology uses the same standard as an original Wi-Fi 6 GHz band. However, an available channel which is owned by the Wi-Fi 6E technology expands to the original Wi-Fi 6 GHz band which is belonged by a frequency band ranged from 5.925 to 7.125 GHz. Currently, the original Wi-Fi 6 GHz band is adopted popularly, and electronic devices are developed towards a miniaturization trend, multiband antennas that support the Wi-Fi 6 GHz band and have smaller sizes are greatly needed.

Therefore, it is necessary to provide a multiband printed antenna which increases providable frequency bands and supports a Wi-Fi 6 GHz frequency band in a limited space.

BACKGROUND OF THE INVENTION

The present invention generally relates to an antenna, and more particularly to a multiband printed antenna which is able to operate in multiple frequency bands.

SUMMARY OF THE INVENTION

An object of the present invention is to provide a multiband printed antenna equipped in an electronic device. The multiband printed antenna is arranged on a circuit board of the electronic device. The multiband printed antenna is able to operate in multiple frequency bands. The multiband printed antenna includes a radiation unit and a grounding unit. The radiation unit is arranged at a right of the circuit board. The radiation unit includes a first radiation part extended horizontally, and a second radiation part which is extended upward and then is bent rightward from a left of a top edge of the first radiation part. The first radiation part is formed in a strip shape. The second radiation part is formed in a lying L shape. A left end of a lower portion of the first radiation part has a feed-in portion. The grounding unit is arranged at a left of the circuit board. The grounding unit is separated from the radiation unit by a first horizontal distance. The grounding unit is arranged adjacent to a left of the radiation unit. The grounding unit includes a first extension extended vertically, a second extension straightly extended leftward from a top of a first left edge of the first extension, a grounding part straightly extended leftward from a bottom of the first left edge of the first extension, and a third extension straightly extended leftward from a middle of the first left edge of the first extension. The first extension is formed in a rectangular shape. The first extension is disposed longitudinally. The first extension is disposed adjacent to the left of the radiation unit. A first right edge of the first extension is separated from a second left edge of the radiation unit by the first horizontal distance. The third extension is disposed between the second extension and the grounding part along an up-down direction. The third extension is separated from the second extension by a first vertical distance, and the third extension is separated from the grounding part by a second vertical distance, the second extension, the third extension and the grounding part are rectangular strap shapes, the second extension, the third extension and the grounding part are disposed transversely.

Another object of the present invention is to provide a multiband printed antenna arranged on a circuit board of the electronic device. The multiband printed antenna includes a radiation unit and a grounding unit. The radiation unit is arranged at a right of the circuit board. The radiation unit includes a first radiation part extended horizontally, and a second radiation part which is extended upward and then is bent rightward from a left of a top edge of the first radiation part. The first radiation part is formed in a strip shape. The second radiation part is formed in a lying L shape. A left end of a lower portion of the first radiation part has a feed-in portion. The grounding unit is arranged at a left of the circuit board. The grounding unit includes a first extension extended vertically, a second extension straightly extended leftward from a top of a first left edge of the first extension, a grounding part straightly extended leftward from a bottom of the first left edge of the first extension, and a third extension straightly extended leftward from a middle of the first left edge of the first extension. The first extension is formed in a rectangular shape. The first extension is disposed longitudinally. The first extension is disposed adjacent to a left of the radiation unit. The third extension is disposed between the second extension and the grounding part along an up-down direction. The second extension, the third extension and the grounding part are rectangular strap shapes. The second extension, the third extension and the grounding part are disposed transversely. The second extension, the third extension and the grounding part are parallel. A first right edge of the first extension is separated from a second left edge of the radiation unit by a first horizontal distance, the second radiation part includes a first zone extended upward from a left of the top edge of the first radiation part, and a second zone straightly extended rightward from a top of a second right edge of the first zone, the second zone extends rightward, and the second zone extends beyond a first tail edge of the first radiation part, so that a second tail edge of the second zone is separated from the first tail edge of the first radiation part by a second horizontal distance. A first upper edge of the third extension is separated from a first lower edge of the second extension by a first vertical distance, a second lower edge of the third extension is separated from a second upper edge of the grounding part by a second vertical distance, a first bottom edge of the first zone is flush with a second bottom edge of the grounding part and a third bottom edge of the first extension, a fourth bottom edge of the second zone is separated from the top edge of the first radiation part by a third vertical distance.

Another object of the present invention is to provide a multiband printed antenna arranged on a circuit board of the electronic device. The multiband printed antenna includes a radiation unit and a grounding unit. The radiation unit is arranged at a right of the circuit board. The radiation unit includes a first radiation part extended horizontally, and a second radiation part which is extended upward and then is bent rightward from a left of a top edge of the first radiation part. The first radiation part is formed in a strip shape. The second radiation part is formed in a lying L shape. A left end of a lower portion of the first radiation part has a feed-in portion. The grounding unit is arranged at a left of the circuit board. The grounding unit includes a first extension extended vertically, a second extension straightly extended leftward from a top of a first left edge of the first extension, a grounding part straightly extended leftward from a bottom of the first left edge of the first extension, and a third extension straightly extended leftward from a middle of the first left edge of the first extension. The first extension is formed in a rectangular shape. The first extension is disposed longitudinally. The first extension is disposed adjacent to a left of the radiation unit. The third extension is disposed between the second extension and the grounding part along an up-down direction. The second extension, the third extension and the grounding part are rectangular strap shapes. The second extension, the third extension and the grounding part are disposed transversely. The second extension, the third extension and the grounding part are parallel. A first right edge of the first extension is separated from a second left edge of the radiation unit by a first horizontal distance, the second radiation part includes a first zone extended upward from a left of the top edge of the first radiation part, and a second zone straightly extended rightward from a top of a second right edge of the first zone, the second zone extends rightward, and the second zone extends beyond a first tail edge of the first radiation part, so that a second tail edge of the second zone is separated from the first tail edge of the first radiation part by a second horizontal distance, the second extension extends leftward, and the second extension extends beyond a third tail edge of the third extension, the third extension extends leftward, and the third extension extends beyond a fourth tail edge of the grounding part, a fifth tail edge of the second extension is separated from the third tail edge of the third extension by a third horizontal distance, the fifth tail edge of the second extension is separated from the fourth tail edge of the grounding part by a fourth horizontal distance. A first upper edge of the third extension is separated from a first lower edge of the second extension by a first vertical distance, a second lower edge of the third extension is separated from a second upper edge of the grounding part by a second vertical distance.

As described above, the multiband printed antenna according to the present invention is operated in a limited space, the multiband printed antenna increases the providable frequency bands, and the multiband printed antenna is operated in wider bandwidths which support a Wi-Fi 6 GHz frequency band to adapt to a development trend of a Wi-Fi 6E technology popularity and miniaturization of electronic products.

BRIEF DESCRIPTION OF DRAWINGS

The present invention will be apparent to those skilled in the art by reading the following description, with reference to the attached drawings, in which:

FIG. 6 is a data table showing efficiencies of the multiband printed antenna which are corresponding to frequencies of the multiband printed antenna in accordance with the preferred embodiment of the present invention.

DETAILED DESCRIPTION OF THE INVENTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
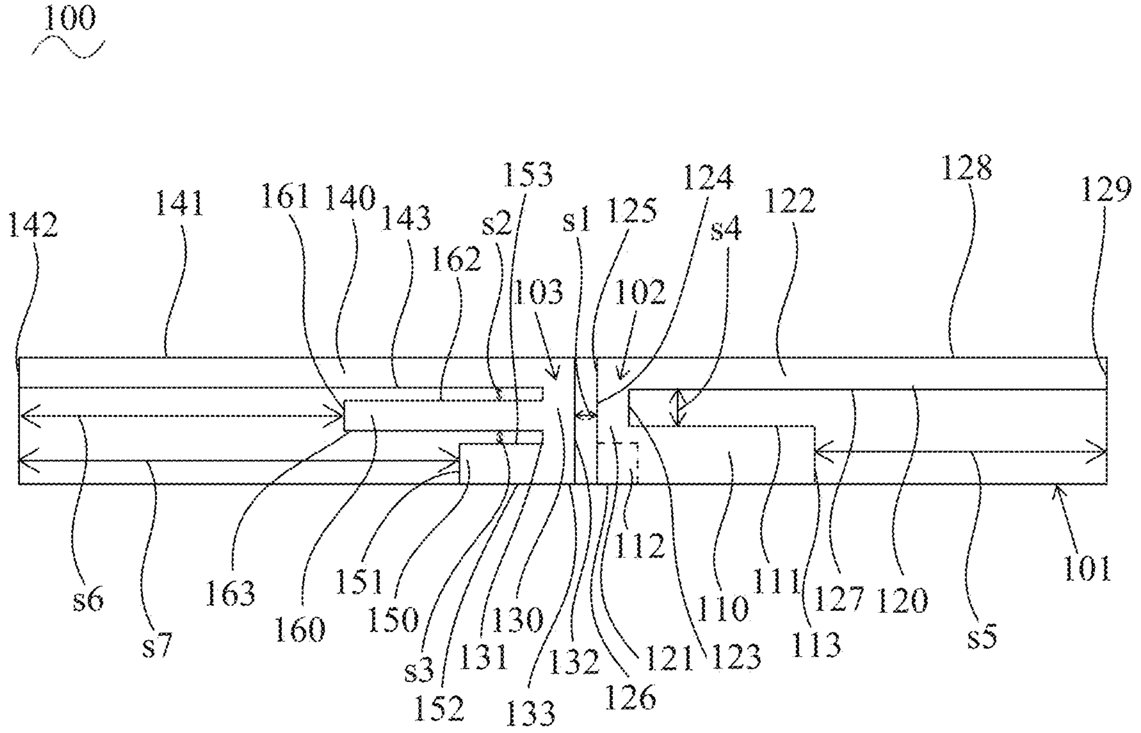
FIG. 1 is a structure view of a multiband printed antenna according to a preferred embodiment of the present invention.

Referring to FIG. 1, a multiband printed antenna 100 in accordance with the present invention is shown. The multiband printed antenna 100 is a dipole antenna. The multiband printed antenna 100 is equipped in an electronic device (not labeled). The multiband printed antenna 100 is arranged on a circuit board 101 of the electronic device. The multiband printed antenna 100 includes a radiation unit 102 and a grounding unit 103. The radiation unit 102 and the grounding unit 103 are arranged on the circuit board 101, and the radiation unit 102 and the grounding unit 103 are separated from each other.

The radiation unit 102 is arranged at a right of the circuit board 101 of the multiband printed antenna 100. The radiation unit 102 includes a first radiation part 110 and a second radiation part 120. The first radiation part 110 is formed in a strip shape, and the first radiation part 110 is extended horizontally. A left end of a lower portion of the first radiation part 110 has a feed-in portion 112. The second radiation part 120 is extended upward and then is bent rightward from a left of a top edge 111 of the first radiation part 110, and the second radiation part 120 is formed in a lying L shape.

The grounding unit 103 is arranged at a left of the circuit board 101 of the multiband printed antenna 100. The grounding unit 103 is arranged adjacent to a left of the radiation unit 102. The grounding unit 103 and the radiation unit 102 are abreast arranged transversely. The grounding unit 103 is separated from the radiation unit 102 by a first horizontal distance s1. The grounding unit 103 includes a first extension 130 extended vertically, a second extension 140 straightly extended leftward from a top of a first left edge 131 of the first extension 130, a grounding part 150 straightly extended leftward from a bottom of the first left edge 131 of the first extension 130, and a third extension 160 straightly extended leftward from a middle of the first left edge 131 of the first extension 130. The first extension 130 is formed in a rectangular shape. The first extension 130 is disposed longitudinally. The first extension 130 is disposed adjacent to the left of the radiation unit 102. A first right edge 132 of the first extension 130 is separated from a second left edge 125 of the radiation unit 102 by the first horizontal distance s1.

The third extension 160 is disposed between the second extension 140 and the grounding part 150 along an up-down direction. The second extension 140, the third extension 160 and the grounding part 150 are parallel to one another. The third extension 160 is separated from the second extension 140 by a first vertical distance s2, and the third extension 160 is separated from the grounding part 150 by a second vertical distance s3. A first upper edge 162 of the third extension 160 is separated from a first lower edge 143 of the second extension 140 by a first vertical distance s2. A second lower edge 163 of the third extension 160 is separated from a second upper edge 153 of the grounding part 150 by a second vertical distance s3. The second extension 140, the third extension 160 and the grounding part 150 are rectangular strap shapes. The second extension 140, the third extension 160 and the grounding part 150 are disposed transversely.

Referring to FIG. 1, in this preferred embodiment, the second radiation part 120 includes a first zone 121 extended upward from a left of the top edge 111 of the first radiation part 110, and a second zone 122 straightly extended rightward from a top of a second right edge 123 of the first zone 121. The second zone 122 is parallel to the first radiation part 110. A third left edge 124 of the first zone 121 is separated from the first right edge 132 of the first extension 130 by the first horizontal distance s1. A first bottom edge 126 of the first zone 121 is flush with a second bottom edge 152 of the grounding part 150 and a third bottom edge 133 of the first extension 130. The first zone 121 is extended vertically, and the first zone 121 is formed in a short rectangular bar shape. The second zone 122 is extended horizontally, and the second zone 122 is formed in a long rectangular bar shape. A fourth bottom edge 127 of the second zone 122 is separated from the top edge 111 of the first radiation part 110 by a third vertical distance s4. A first topmost edge 128 of the second zone 122 is flush with a second topmost edge 141 of the second extension 140.

In the preferred embodiment, a length of the second zone 122 is similar to a length of the second extension 140. The second zone 122 extends rightward, and the second zone 122 extends beyond a first tail edge 113 of the first radiation part 110, so that a second tail edge 129 of the second zone 122 is separated from the first tail edge 113 of the first radiation part 110 by a second horizontal distance s5. The second extension 140 extends leftward, and the second extension 140 extends beyond a third tail edge 161 of the third extension 160. The third extension 160 extends leftward, and the third extension 160 extends beyond a fourth tail edge 151 of the grounding part 150, so that a fifth tail edge 142 of the second extension 140 is separated from the third tail edge 161 of the third extension 160 by a third horizontal distance s6. The fifth tail edge 142 of the second extension 140 is separated from the fourth tail edge 151 of the grounding part 150 by a fourth horizontal distance s7.

Each of the first horizontal distance s1, the first vertical distance s2, the second vertical distance s3, the third vertical distance s4, the second horizontal distance s5, the third horizontal distance s6 and the fourth horizontal distance s7 has a dimensional requirement to have a coupling function. Electric fields and magnetic fields of the feed-in portion 112, the first radiation part 110 and the second radiation part 120 are interactively transmitted, and the electric fields and the magnetic fields of the feed-in portion 112, the first radiation part 110 and the second radiation part 120 are interacted to oscillate electromagnetic waves in a frequency band which is ranged from 2.4 GHz to 2.5 GHz and a frequency band which is ranged from 5 GHz to 7.2 GHz. In practice, dimensional requirements of the first horizontal distance s1, the first vertical distance s2, the second vertical distance s3, the third vertical distance s4, the second horizontal distance s5, the third horizontal distance s6 and the fourth horizontal distance s7 are adjusted according to different applied electronic devices.

When the multiband printed antenna 100 is used for a wireless communication, a current is fed by the feed-in portion 112. The current passes through the first radiation part 110, electromagnetic waves in the frequency band which is ranged from 5 GHz to 7.2 GHz are oscillated, and simultaneously, the current passes through the second radiation part 120, electromagnetic waves in the frequency band which is ranged from 2.4 GHz to 2.5 GHz are oscillated. The first extension 130 and the second extension 140 are together coupled with the feed-in portion 112 to oscillate the electromagnetic waves in the frequency band which is ranged from 2.4 GHz to 2.5 GHz. The third extension 160 and the feed-in portion 112 are mutually coupled with each other to oscillate the electromagnetic waves in the frequency band which is ranged from 5 GHz to 7.2 GHz. So, the multiband printed antenna 100 increases the providable frequency bands and supports a Wi-Fi 6 GHz frequency band in a limited space.

Figure 2:
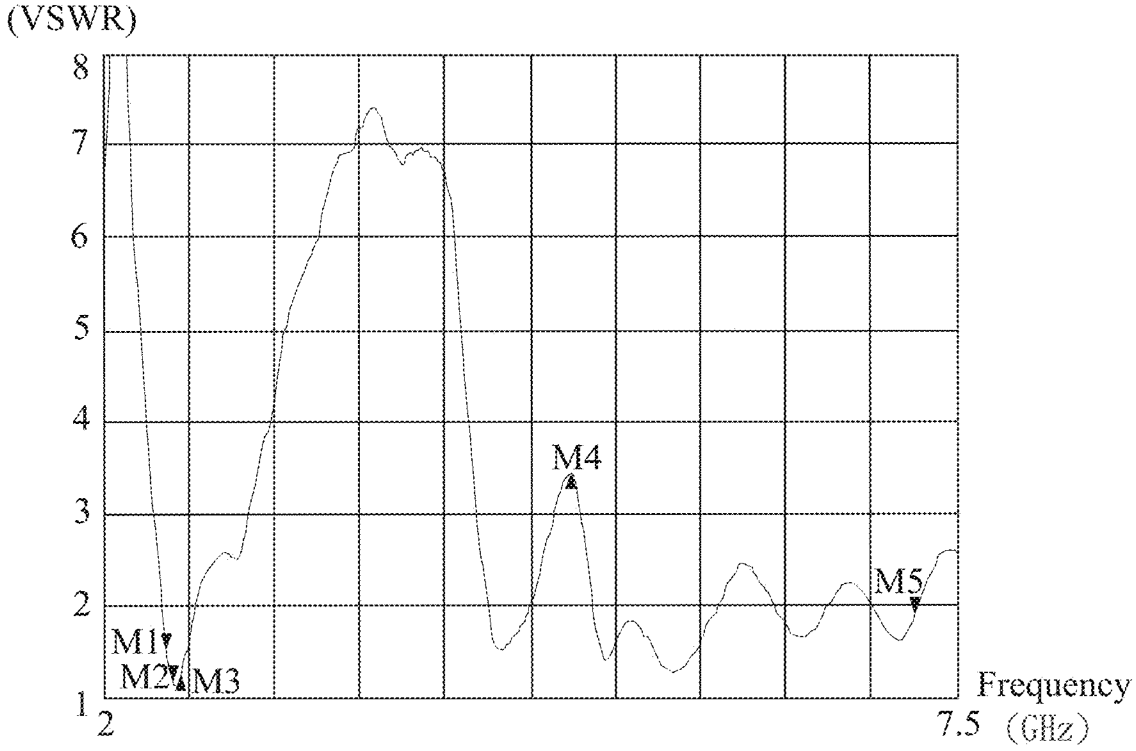
FIG. 2 is a voltage standing wave ratio (VSWR) chart of the multiband printed antenna according to the preferred embodiment of the present invention.
Figure 3:
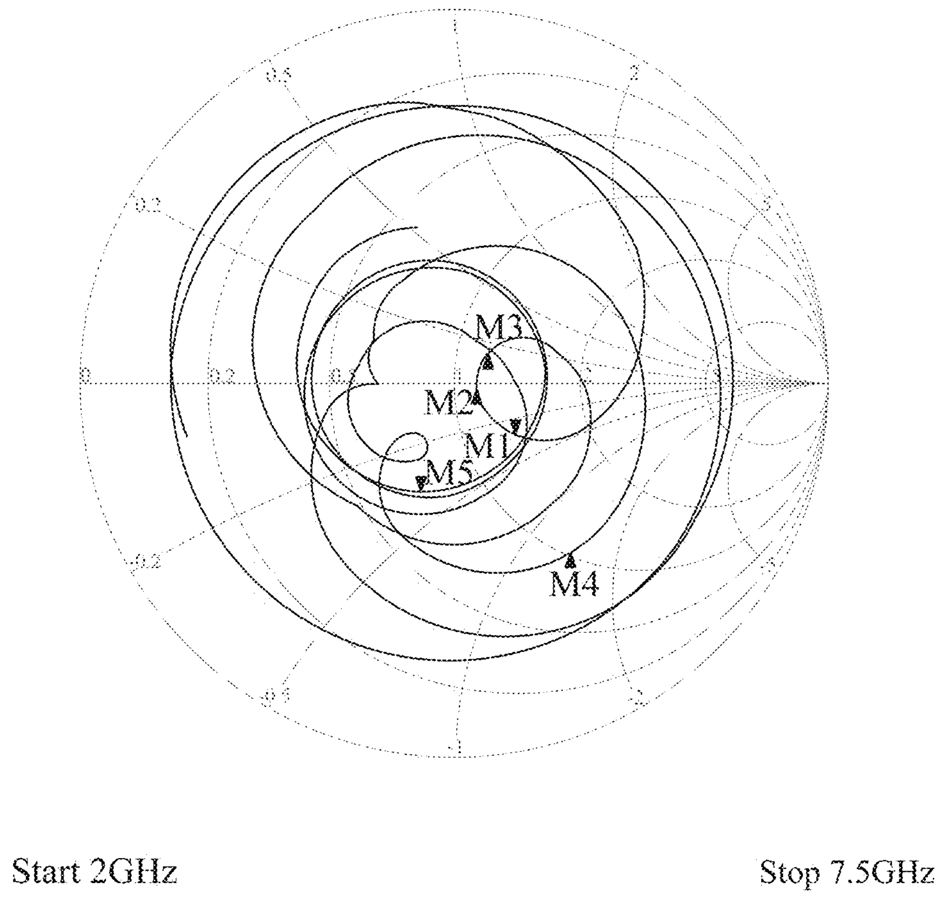
FIG. 3 is a smith chart of the multiband printed antenna according to the preferred embodiment of the present invention.
Figure 4:
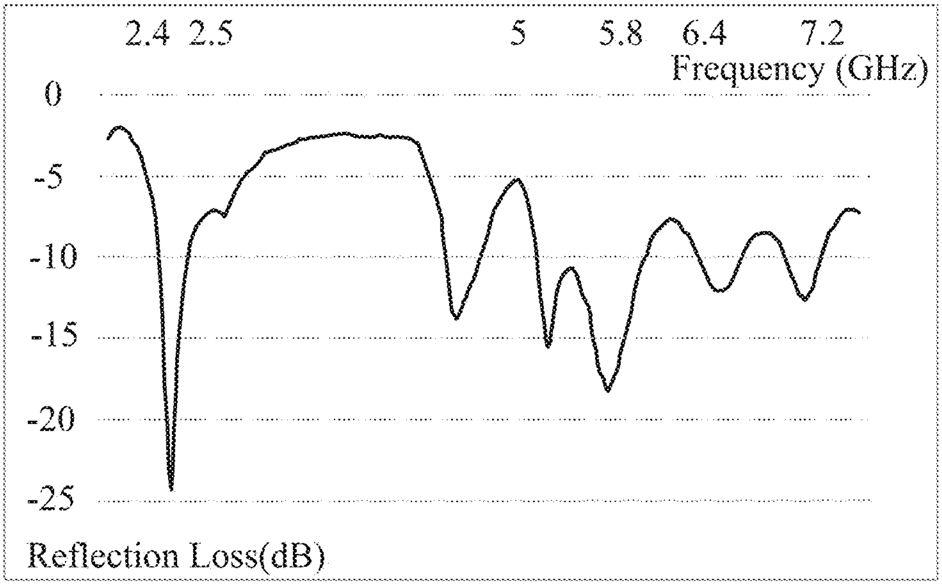
FIG. 4 is a reflection loss chart of the multiband printed antenna according to the preferred embodiment of the present invention.

Referring to FIG. 1 to FIG. 3, a voltage standing wave ratio (VSWR) chart of the multiband printed antenna 100 according to the present invention is shown in FIG. 2. A smith chart of the multiband printed antenna 100 according to the present invention is shown in FIG. 3. When the multiband printed antenna 100 is operated at 2.4 GHz, a VSWR value is 1.5526 which is shown at a position M1 of FIG. 2. When the multiband printed antenna 100 is operated at 2.45 GHz, a VSWR value is 1.474 which is shown at a position M2 of FIG. 2. When the multiband printed antenna 100 is operated at 2.5 GHz, a VSWR value is 1.2648 which is shown at a position M3 of FIG. 2. When the multiband printed antenna 100 is operated at 5 GHz, a VSWR value is 3.4369 which is shown at a position M4 of FIG. 2. When the multiband printed antenna 100 is operated at 7.2 GHz, a VSWR value is 1.8739 which is shown at a position M5 of FIG. 2. Therefore, the multiband printed antenna 100 according to the present invention are able to be stably operated in the frequency band which is ranged from 2.4 GHz to 2.5 GHz and the frequency band which is ranged from 5 GHz to 7.2 GHz.

Referring to FIG. 1 to FIG. 4, when the multiband printed antenna 100 is operated at the frequency band which is ranged from 2.4 GHz to 2.5 GHz and the frequency band which is ranged from 5 GHz to 7.2 GHz, reflection losses of bandwidths of the frequency band which is ranged from 2.4 GHz to 2.5 GHz and the frequency band which is ranged from 5 GHz to 7.2 GHz are approximately within −5 dB, so a loss extent of the multiband printed antenna 100 is small, and a radiation energy of the multiband printed antenna 100 is large.

Figure 5:
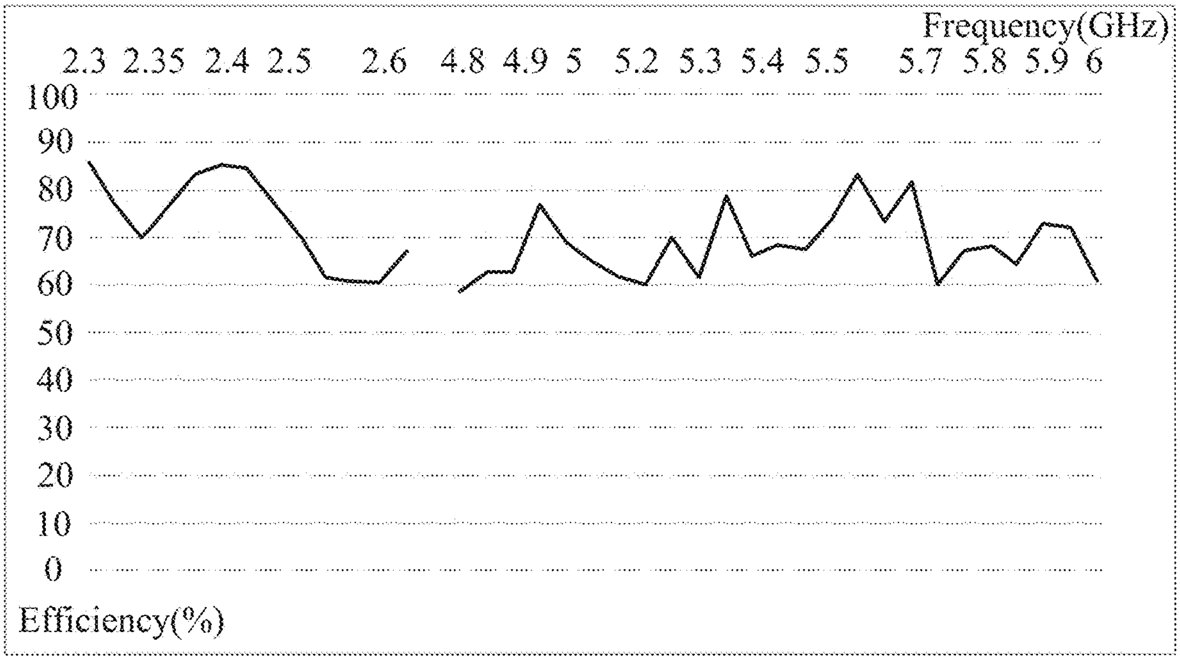
FIG. 5 is an efficiency chart of the multiband printed antenna according to the preferred embodiment of the present invention.

Referring to FIG. 1 to FIG. 6, an efficiency chart of the multiband printed antenna 100 according to the present invention is shown in FIG. 5. A data table of the multiband printed antenna 100 according to the present invention is shown in FIG. 6. Generally speaking, when the multiband printed antenna 100 is operated at different frequencies, the higher an efficiency of the multiband printed antenna 100 which is converted from an average power is, the better the efficiency of the multiband printed antenna 100 is. In this preferred embodiment, the efficiencies of the multiband printed antenna 100 that are operated at the frequency band which is ranged from 2.4 GHz to 2.5 GHz and the frequency band which is ranged from 5 GHz to 7.2 GHz are mostly above 60%, therefore, the multiband printed antenna 100 is operated in the limited space and is able to achieve a higher efficiency in a predetermined frequency band. In addition, the efficiency of the multiband printed antenna 100 keeps a certain level.

As described above, the multiband printed antenna 100 according to the present invention is operated in the limited space, the multiband printed antenna 100 increases the providable frequency bands, and the multiband printed antenna 100 is operated in wider bandwidths which support the Wi-Fi 6 GHz frequency band to adapt to a development trend of a Wi-Fi 6E technology popularity and miniaturization of electronic products.

Though the present invention is disclosed as the abovementioned preferred embodiment, the preferred embodiment disclosed in this invention is without being intended to limit a scope of this invention. In related technical fields, anyone with ordinary knowledges should be able to make a few changes and embellishments within a spirit and a protection scope of this invention, so the protection scope of this invention should regard defined claims of an attached application patent as a standard.

What is claimed is:

1. A multiband printed antenna equipped in an electronic device, the multiband printed antenna being arranged on a circuit board of the electronic device, the multiband printed antenna comprising:

a radiation unit arranged at a right of the circuit board, the radiation unit including a first radiation part extended horizontally, and a second radiation part which is extended upward and then is bent rightward from a left of a top edge of the first radiation part, the first radiation part being formed in a strip shape, the second radiation part being formed in a lying L shape, a left end of a lower portion of the first radiation part having a feed-in portion; and a grounding unit arranged at a left of the circuit board, the grounding unit being separated from the radiation unit by a first horizontal distance, the grounding unit being arranged adjacent to a left of the radiation unit, the grounding unit including a first extension extended vertically, a second extension straightly extended leftward from a top of a first left edge of the first extension, a grounding part straightly extended leftward from a bottom of the first left edge of the first extension, and a third extension straightly extended leftward from a middle of the first left edge of the first extension, the first extension being formed in a rectangular shape, the first extension being disposed longitudinally, the first extension being disposed adjacent to the left of the radiation unit, a first right edge of the first extension being separated from a second left edge of the radiation unit by the first horizontal distance, the third extension being disposed between the second extension and the grounding part along an up-down direction;

wherein the third extension is separated from the second extension by a first vertical distance, and the third extension is separated from the grounding part by a second vertical distance, the second extension, the third extension and the grounding part are rectangular strap shapes, the second extension, the third extension and the grounding part are disposed transversely;

wherein the second radiation part includes a first zone extended upward from a left of the top edge of the first radiation part, and a second zone straightly extended rightward from a top of a second right edge of the first zone, the first zone is extended vertically, and the first zone is formed in a short rectangular bar shape, the second zone is extended horizontally, and the second zone is formed in a long rectangular bar shape;

a third left edge of the first zone is separated from the first right edge of the first extension by the first horizontal distance, the second zone is parallel to the first radiation part, the second zone extends rightward, and the second zone extends beyond a first tail edge of the first radiation part, so that a second tail edge of the second zone is separated from the first tail edge of the first radiation part by a second horizontal distance.

2. The multiband printed antenna as claimed in claim 1, wherein the second extension extends leftward, and the second extension extends beyond a third tail edge of the third extension, the third extension extends leftward, and the third extension extends beyond a fourth tail edge of the grounding part, so that a fifth tail edge of the second extension is separated from the third tail edge of the third extension by a third horizontal distance, the fifth tail edge of the second extension is separated from the fourth tail edge of the grounding part by a fourth horizontal distance.

3. The multiband printed antenna as claimed in claim 1, wherein a first topmost edge of the second zone is flush with a second topmost edge of the second extension.

4. The multiband printed antenna as claimed in claim 1, wherein a first bottom edge of the first zone is flush with a second bottom edge of the grounding part and a third bottom edge of the first extension.

5. The multiband printed antenna as claimed in claim 4, wherein a fourth bottom edge of the second zone is separated from the top edge of the first radiation part by a third vertical distance.

6. The multiband printed antenna as claimed in claim 1, wherein the grounding unit and the radiation unit are abreast arranged transversely.

7. The multiband printed antenna as claimed in claim 1, wherein the second extension, the third extension and the grounding part are parallel to one another.

8. A multiband printed antenna arranged on a circuit board of an electronic device, the multiband printed antenna comprising:

a radiation unit arranged at a right of the circuit board, the radiation unit including a first radiation part extended horizontally, and a second radiation part which is extended upward and then is bent rightward from a left of a top edge of the first radiation part, the first radiation part being formed in a strip shape, the second radiation part being formed in a lying L shape, a left end of a lower portion of the first radiation part having a feed-in portion; and a grounding unit arranged at a left of the circuit board, the grounding unit including a first extension extended vertically, a second extension straightly extended leftward from a top of a first left edge of the first extension, a grounding part straightly extended leftward from a bottom of the first left edge of the first extension, and a third extension straightly extended leftward from a middle of the first left edge of the first extension, the first extension being formed in a rectangular shape, the first extension being disposed longitudinally, the first extension being disposed adjacent to a left of the radiation unit, the third extension being disposed between the second extension and the grounding part along an up-down direction, the second extension, the third extension and the grounding part being rectangular strap shapes, the second extension, the third extension and the grounding part being disposed transversely, the second extension, the third extension and the grounding part being parallel;

wherein a first right edge of the first extension is separated from a second left edge of the radiation unit by a first horizontal distance, the second radiation part includes a first zone extended upward from a left of the top edge of the first radiation part, and a second zone straightly extended rightward from a top of a second right edge of the first zone, the second zone extends rightward, and the second zone extends beyond a first tail edge of the first radiation part, so that a second tail edge of the second zone is separated from the first tail edge of the first radiation part by a second horizontal distance; and wherein a first upper edge of the third extension is separated from a first lower edge of the second extension by a first vertical distance, a second lower edge of the third extension is separated from a second upper edge of the grounding part by a second vertical distance, a first bottom edge of the first zone is flush with a second bottom edge of the grounding part and a third bottom edge of the first extension, a fourth bottom edge of the second zone is separated from the top edge of the first radiation part by a third vertical distance.

9. A multiband printed antenna arranged on a circuit board of an electronic device, the multiband printed antenna comprising:

a radiation unit arranged at a right of the circuit board, the radiation unit including a first radiation part extended horizontally, and a second radiation part which is extended upward and then is bent rightward from a left of a top edge of the first radiation part, the first radiation part being formed in a strip shape, the second radiation part being formed in a lying L shape, a left end of a lower portion of the first radiation part having a feed-in portion; and a grounding unit arranged at a left of the circuit board, the grounding unit including a first extension extended vertically, a second extension straightly extended leftward from a top of a first left edge of the first extension, a grounding part straightly extended leftward from a bottom of the first left edge of the first extension, and a third extension straightly extended leftward from a middle of the first left edge of the first extension, the first extension being formed in a rectangular shape, the first extension being disposed longitudinally, the first extension being disposed adjacent to a left of the radiation unit, the third extension being disposed between the second extension and the grounding part along an up-down direction, the second extension, the third extension and the grounding part being rectangular strap shapes, the second extension, the third extension and the grounding part being disposed transversely, the second extension, the third extension and the grounding part being parallel;

wherein a first right edge of the first extension is separated from a second left edge of the radiation unit by a first horizontal distance, the second radiation part includes a first zone extended upward from a left of the top edge of the first radiation part, and a second zone straightly extended rightward from a top of a second right edge of the first zone, the second zone extends rightward, and the second zone extends beyond a first tail edge of the first radiation part, so that a second tail edge of the second zone is separated from the first tail edge of the first radiation part by a second horizontal distance, the second extension extends leftward, and the second extension extends beyond a third tail edge of the third extension, the third extension extends leftward, and the third extension extends beyond a fourth tail edge of the grounding part, a fifth tail edge of the second extension is separated from the third tail edge of the third extension by a third horizontal distance, the fifth tail edge of the second extension is separated from the fourth tail edge of the grounding part by a fourth horizontal distance; and wherein a first upper edge of the third extension is separated from a first lower edge of the second extension by a first vertical distance, a second lower edge of the third extension is separated from a second upper edge of the grounding part by a second vertical distance.

* * * * *